United States Patent [19]

Schnell

[11] Patent Number: 4,695,179

[45] Date of Patent: Sep. 22, 1987

[54] FASTENING ARRANGEMENT FOR A MINIMUM OF THREE STRUTS ALONG THE SPATIAL AXES

[76] Inventor: Raimund Schnell, Hans-Saxer-Str. 9, Eichberg SG, Switzerland, 9451

[21] Appl. No.: 801,851

[22] Filed: Nov. 26, 1985

[30] Foreign Application Priority Data

Nov. 28, 1984 [CH] Switzerland ................... 05672/84

[51] Int. Cl.$^4$ .............................................. F16D 1/00
[52] U.S. Cl. ..................................... 403/24; 403/218; 403/400
[58] Field of Search ............... 403/218, 219, 400, 391, 403/24

[56] References Cited

U.S. PATENT DOCUMENTS

| | | | |
|---|---|---|---|
| 3,360,883 | 1/1968 | Glanzer | 403/400 X |
| 3,512,813 | 5/1970 | Brimberg | 403/219 X |
| 4,027,988 | 6/1977 | Kum | 403/218 |

Primary Examiner—Andrew V. Kundrat
Attorney, Agent, or Firm—Browdy and Neimark

[57] ABSTRACT

A fastening arrangement for a minimum of three struts along the spatial axes has two interconnectable retainers, each of whose outer surfaces follows the surface of a simple geometric body, and each of whose opposing inwardly facing sides is formed from the surface of a cut through the geometric body. Additionally, the retainers have drilled recesses, along the spatial axes, to accept the struts, whose axes cross each other. By means of the drilled recesses, each retainer forms a three-armed body.

15 Claims, 7 Drawing Figures

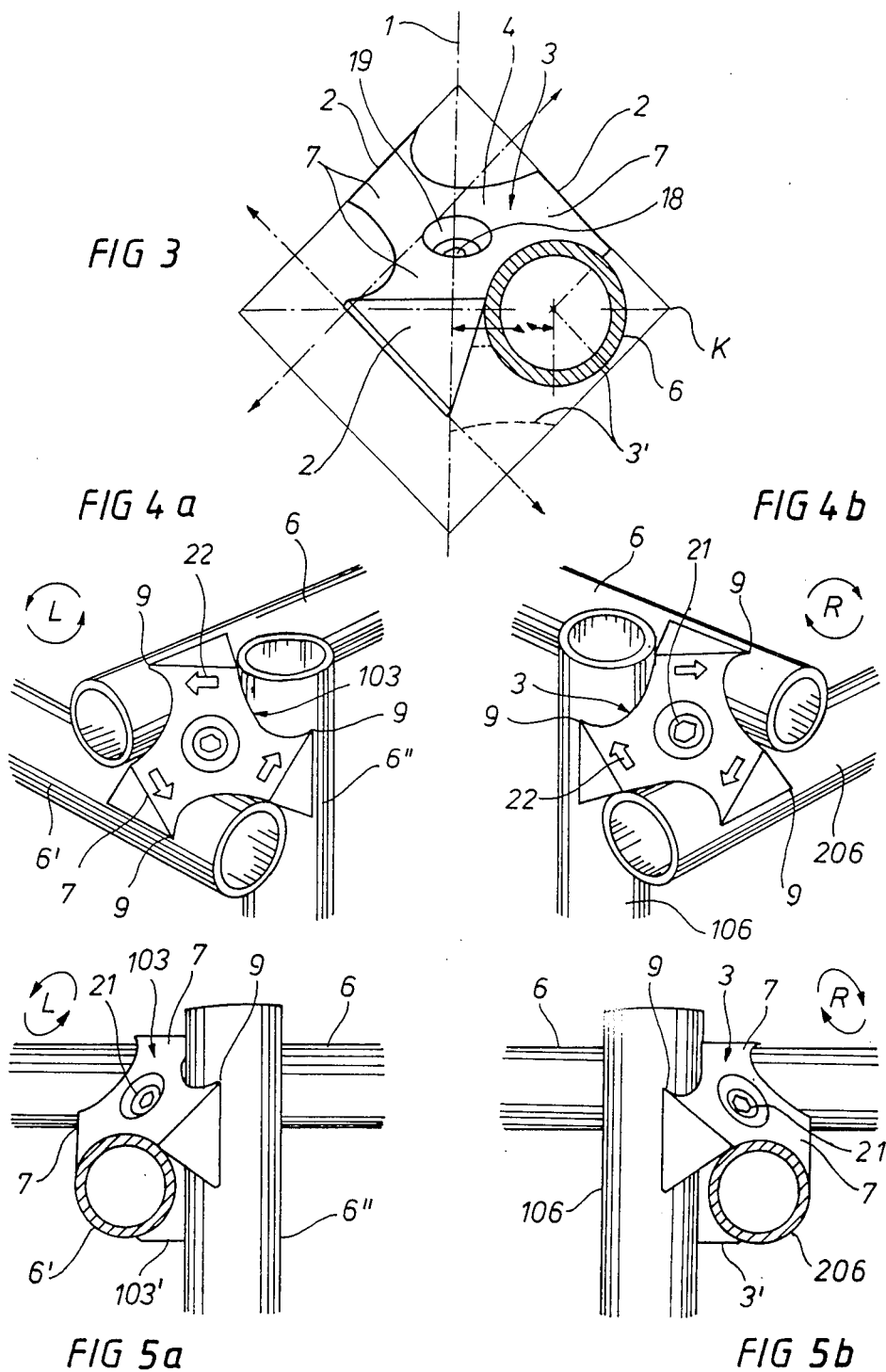

FASTENING ARRANGEMENT FOR A MINIMUM OF THREE STRUTS ALONG THE SPATIAL AXES

BACKGROUND OF THE INVENTION

The invention concerns a fastening arrangement for a minimum of three struts along the spatial axes, consisting of two interconnectable retainers, each of whose outer surfaces follows the surface of a simple geometric body, and each of whose opposing inwardly facing sides is formed from the surface of a cut through the geometric body. Additionally, the retainers have drilled recesses, along the spatial axes, to accept the struts, whose axes cross each other. By means of the drilled recesses, each retainer forms a three-armed body.

It is to be understood that the term "along the spatial axes" means that the axes form, with each other, right angles in different spatial directions. The term "drilled recesses" is to be preferably understood as cylindrical bores, but the invention should not be limited to this sectional shape. The term "struts" in the sense of the invention, should be understood to encompass solid or hollow random sections such as rods, tubes or similar. When "sections" are referred to, this is always to be understood as a geometric term, i.e. the affected parts are not necessarily to be manufactured from a larger body through actual cutting.

By the above definition, a three-armed body is outlined, which, in accordance with a known proposal, derives from a simple geometric body, namely, a sphere. This creates then for each retainer, a spherical segment which becomes a three-armed body in that the three drillings pass through the sphere, as it were, secant-style, and that the base circle on the spherical segment is correspondingly hollowed out of the opposing retainer. The arms of both retainers grip into each other and this encloses the struts over more than 360°. In principle, such a fastening arrangement proves itself reliable in that it consists of few parts which are relatively simple to produce and creates very rigid fastenings for frame corner connections of all types.

Especially for shelf construction, furniture, and the like, it has been necessary, up to now, in the case of shelves, bulkheads and similar, to form a corresponding recess in the board for the spherical segment when this has to abut the frame formed from tubes or rods. Furthermore, the assembly and disassembly are not easy in that a complete connecting element has to be disassembled.

SUMMARY OF THE INVENTION

An object of the present invention is to avoid the disadvantages of the fastening arrangement of the type mentioned above. This is achieved, in accordance with the present invention, in that a simple geometrical body is a cube-like body from which each corner at the end of a diagonal of the cube-like body, is cut off in the form of a corner pyramid, to form a retainer, and a further cut is made for the formation of the face opposing the other retainer through a junction plane at a distance from the base of the pyramid, which is perpendicular to the diagonal, and wherein in each retainer drilled recesses, corresponding to the section of the strut, extend from the junction plane.

By means of this formation, not only are the above defined problems solved, but additionally, a savings of material and weight is achieved which also reduces the cost of the fastening arrangement. The even triangular base surface of the cut-off pyramid-shaped corners creates a compact formation which does not hinder the close fitting of shelf boards. The remaining three rigid arms surround the tubes or struts in an almost triangular section. Compared to the known spherical form, the struts or tubes are generally not embraced over a particularly large angle area (relative to the drilling axis), which is particularly advantageous because assembly and disassembly are thereby simplified in that both retainers need to be only slightly loosened to either fit or remove the struts.

In terms of mass production and usage it is economical if both retainers are formed from a cube-like body, each in identical geometric form, which also simplifies stock requirements and assembly. It is to be noted at this point that the term "cube-like body" encompasses not only a cube, but also slight deviations from the cube shape, as will be shown by means of the later description, which are still within the scope of the present invention. This term also comprehends a block or prismatic shape whose adjacent abutting surfaces are not completely parallel.

It is preferred that the drilled recesses are almost tangential to two adjacent surfaces of the cube-like body and pass through the body.

It should be kept in mind that, because the three struts which are to be connected are not completely embraced by the three arms by reason of the cube-like form of the basic body, a slight rotation or displacement may be enough to impair the hold of the struts, particularly when they are heavy or have to carry a heavy load. In this case it is recommended that both retainers be provided with mutually engaging projections and recesses on their respective opposing faces. In this way the opposing positions of the retainers are fixed and inadvertent separation of the strut clamping is rendered impossible. Because both retainers can be brought into differing opposing positions relative to the axis of the cube-like body passing through the corner point of the cut-off pyramid-shaped corner (which is also the corner point of the cube-like body), only one of which positions is the correct one, the assembly is simplified if the projections and recesses are arranged rotationally asymmetric with reference to the spatial axis of the cube-like body passing through the corner point of the cut-off pyramid-shaped corner (this spatial axis is the diagonal of the cube and also the axis of the circumference surrounding the three-armed body, when the arms are of the same length). This asymmetry ensures that the projections and recesses can only engage each other in one relative position of the retainers, thus removing any chance of error.

Although the connection fixture can be formed as desired, for example, as a snap or bayonet connection of the opposing arms, as well as the inner surfaces between the retainers, or through clamps through two arms each of both retainers, it is preferred that a bolt-type connection fixture, such as a threaded bolt or the like, extends through the axis of the corner point of the cut-off pyramid-shaped corner of the cube-like body.

For eight struts, four of which form a rectangle on one level, and the other four of which extend vertically from the four corners of this rectangle, four such fastening arrangements are required. In the prior art configuration, all four fastening arrangements were the same, which made the symmetric construction of such a frame impossible. To enable a symmetrical and even construction to be built, a set of four fastening arrangements in accordance with the present invention, of the type discussed above, are used, which are characterized in that two pairs of retainers are formed as a mirror-image of the other two pairs.

Further details arise out of the following description of the schematically illustrated embodiment examples in the drawings.

BRIEF DESCRIPTION OF THE DRAWINGS

FIG. 3. is an axonometric view of a retainer along the axis of a drilled recess.

FIGS. 4A, 4B, 5A and 5B are respective views of mirror-image formed retainers (i.e., LH and RH) in which each FIG. 4 shows an axonometric view along the connecting bolt, and each FIG. 5 is a section through a strut.

DETAILED DESCRIPTION OF PREFERRED EMBODIMENTS

Figure 1:
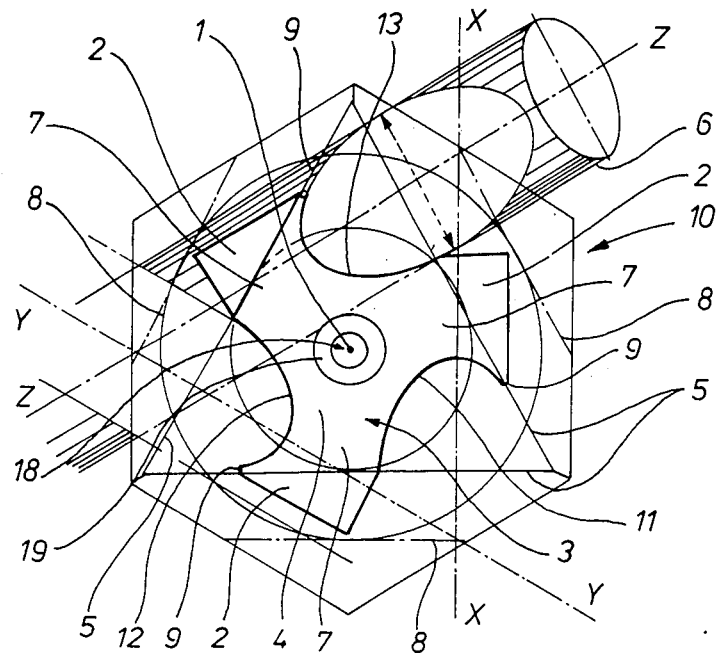
FIG. 1 is an axonometric view of a cube seen from an underneath corner, from which the three-armed body of a retainer is developed.

To obtain one retainer of a fastening element for three cylindrical struts (only one shown in FIG. 1) one of the main surfaces 4 of the retainer 3 is formed by the cutting off a corner of the cube 10 enclosing the retainer 3. The geometric section preferably extends such that the corner of the cube is visualized as a triangular pyramid, whose base is shown as sides 5. The triangular face formed by sides 5 is preferably equilateral, and therefore the cut-off pyramid is regular, so that the three arms 7 of the retainer body 3 are also symmetrical. The section is understood as being geometric, i.e., it is not absolutely necessary for a pyramid to be cut off during manufacture. For some requirements, an oblique pyramid can be intended and advantageous.

Figure 2:
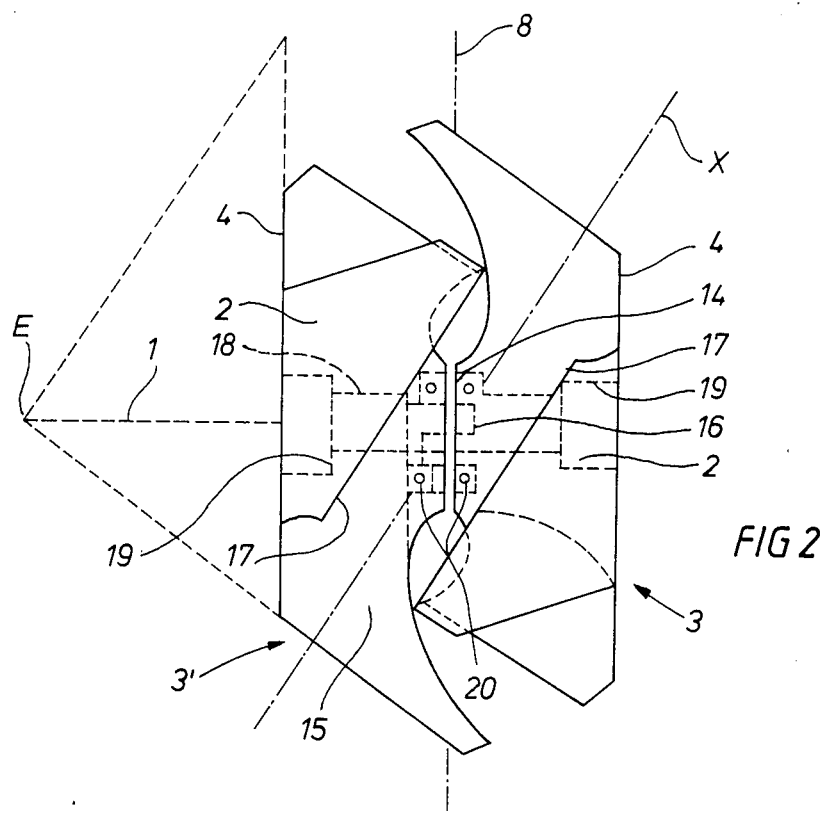
FIG. 2 is a side view of a fastening element from two such retainers fitted together.

Appropriately, the surface of the retainer 3, which faces the other retainer 3', as shown in FIG. 2, is joint face 8, which is parallel to surface 4, whereby projecting or receding parts can be created in relation to this joint face 8. Further, it is possible to form the facing surface between respective retainers 3 and 3' so that it is not completely level; for example, both retainers 3, 3' compared to the corner point E of the cube 1 shown in FIG. 2 may be hollowed out in concave fashion, but this achieves no advantage with the exception of a slight saving in weight and material, for which higher manufacturing costs must be accepted, provided that the retainers are not cast from plastic or light alloy metal.

The bodies arising from the section 4 and 8 would be, in themselves, in plan view, triangular, corresponding approximately to sides 5.

If, to form the drilled recesses 11, 12, 13, aces X, Y and Z are laid parallel to the three surfaces which amongst each other form right angles and also are oriented along or adjacent to the cube faces, in every case parallel to the edges of the cube, only three arms 7 remain from the previously formed triangular body, each of which have an external face 2 which is a part of the previous surface of the cube. Because of the six cube faces, two possibilities exist for the disposition of the three axes X, Y and Z. The arms 7 may be oriented with their more acute points 9 directed either clockwise, as in FIG. 1, or counterclockwise, with reference to the cube diagonal line passing through the corner point E and coinciding with the height of the pyramid. It will be explained later, by means of FIGS. 4 and 5, how this fact can be turned to advantage.

It can be seen from FIG. 2 that the other retainer 3' is angularly displaced in relation to retainer 3 by exactly 180°. It is understood that after separation of the cube 10 along the joint face 8, in accordance with FIG. 1, it could be fitted back to form the same cube 10. Correspondingly then, for the formation of the surface 4, the corner diametrically opposite the cube corner E is to be cut off in the form of a pyramid. Thus, a triangular surface is created which is similar and congruent to the triangle of the sides 5. The point of the triangle is not upwards, as shown by body 3, but downwards, with one side 5 forming the base. In accordance with FIG. 2, the path of the one drilling axis X is not only preferably formed between the two opposite faces 2 of the two retainers 3 and 3', but also the axis X is parallel to the imagined edge of the cube in a plane above the plane of the drawing. This fact is shown especially clearly in FIG. 3, which is a section through the axis X and at the same time shows the edge K of the cube. Analogous relationships also pertain in regard to the other axes Y and Z.

As mentioned, it is preferred that both the retainers 3 and 3' are of identical form as can be seen in FIG. 2. A surface 14 of each retainer 3, 3' passes along the length of the joint face 8, about which face 14 the retainers abut each other. In principle, however, this is not absolutely necessary as, on the contrary, the dimension of the drilled recesses 15 can be widened by the insertion of a spacer, such as a washer, between the surfaces 14. This can be particularly advantagous when both the retainers 3, 3' do not encompass the tubular struts 6 over 270°, as indicated in FIG. 3, but, for example, only over 180°. It is, however, preferred that the edge length of the cube and the length of the retainer arm for a given drilling diameter be so measured that the struts are encompassed over the maximum 360°, preferably between 250° and 300°.

Instead of a level surface 14, both retainers 3, 3' can have on the joint face 8, projections and recesses which engage each other in a tooth-like manner, as shown by the dotted lines 16. In this way it ensures that the parallelity of both edges 17 on the surfaces 2 of both retainers 3, 3' can be exactly maintained, and not be lost by inadvertent rotation. Such rotation might be caused by a threaded bolt, not shown, inserted along the spatial axis 1 (diagonal of cube 10), for which a longitudinal bore 18, having a bore section 19 of a larger diameter to receive a screw head or, at the other end, a nut, is provided. Such a tooth system on the abutting surfaces of both retainers 3, 3' serves, on the one hand, to stabilize the fastening, and, on the other hand, to make possible a larger distance between both edges 17, i.e., both retainers 3,3' can encompass the strut 6 with their arms 7 over a lesser angle than previously. Such a distance would ordinarily have a detrimental effect in that, in the case of inadvertent, slight rotation of both retainers 3, 3', the strut 6 could slide out of the clamping arm 7. However, such a rotation is prevented by the teeth 16.

Additionally, in the interest of assembly and disassembly, it is better to have the angle of grip as small as possible, because then a slight loosening of the threaded bolt is sufficient to fit the struts 6 between the arms 7 or to remove them. For instance, for assembly, the respective struts can be fitted from the side by means of only a slight loosening of the bolt requiring few turns of the bolt to make the fastening firm. In this fashion the assembly can be carried out by a single person whereas previously two people were required.

It is advantageous if the toothed surfaces 16, e.g., formed from the projections and recesses, are, in relation to axis 1, arranged asymmetrically relative to rotation, that is, not in an approximately equal angular distance from each other. This prevents both retainers 3, 3' being incorrectly abutted during assembly because the teeth can only fit into their respective recesses by the correct positioning of the retainers relative to each other. Likewise, each tooth can have a different section or be of a different size to enable easier recognition of the correct fitting position.

A further advantageous measure can be achieved by providing a spring 20 between retainers as shown by dotted lines in FIG. 2. This spring is, in accordance with FIG. 2, a coil spring fitting around the bolt in drilling 18 and which is seated in a drilling of a larger diameter; it could also be, however, particularly in the case of a compression spring, a cup spring fitted between the surfaces 14, or even a spring ring. The use of such a spring ensures that, during disassembly, loosening of the bolt makes both retainers move apart immediately thus slackening the fastening quickly and safely. It would be equally possible, on the other hand, in the case of a coil spring 20, to provide a tension spring to achieve a specific clamping effect of the struts to ease the work of the assembler. Generally, however, a compression spring is preferred as it does not require special anchoring fixtures.

It was previously mentioned that for the arrangement of a three-armed body 3 inside a cube-like body, having six sides, two possibilities exist which lead to a simple modification of the shaping of the retainers. This is to be seen from FIGS. 4A, 4B, and 5A, 5B, in that in the figures identified with an "A", the points 9 of the arms 7—plan view of the base of the cut-off pyramid-shaped corner—are directed towards the left, that is counterclockwise as indicated by the letter "L" in the arrow circle (upper left) and which can also be indicated on the retainers themselves by arrow 22. In the figures indicated by a "B", the point 9 of the arms 7 are directed to the right, or clockwise, as indicated in the figures by an "R" in the arrow circle (upper right) and on the respective retainers 3 by an arrow 22.

It is also to be seen that the strut 6 is visible in both the "A" and "B" figures. If one imagines the struts as being continuous from Figs. A to Figs. B, then the fastening element of 4A (or 5A) represents the left hand fastening and 4B (or 5B) represents the right hand fastening. In this fashion, therefore, strut 6 is connected on its left side to strut 6' or 6" and on its right side to the struts 106 and 206. Both plan views of the respective right hand 3 and left hand retainer 103 in FIGS. 4A and 4B therefore show that the arrangement of the struts 6, 6', 6" on one side is a mirror image of the struts 6, 106, 206 on the other side, which was not possible in the known design of similarly formed retainers.

The side view in FIGS. 5A and 5B show an underneath view (partially obscured by struts 6" and 106) of the opposing retainers 3', 103' encompassing the strut 6 and through which is fitted a socket-headed bolt 21.

The FIGS. 4A, 4B and 5A, 5B, also show the respective three struts 6, 6', 6" or 6, 106, 206 form a right angle with each other along the three spatial axes and also the configuration of the corresponding drilled recesses 11, 12, 13 in each respective retainer.

Within the scope of the invention numerous deviations from the embodiment example are possible, for example, it is not imperative that the struts 6 should always be of cylindrical cross-section; on the contrary, oval, polygonal or even square sections are optional variations in this context.

I claim:

1. A retainer for use in a fastening arrangement for a minimum of three struts along the spatial axes, comprising:
   a body having a shape, regardless of how formed, which is that shape which would result from cutting a three-sided pyramid-shaped corner from a cube-like body, cutting a second joint face parallel to the face made by the base of the cut-away pyramid at a distance therefrom, and drilling boreholes through the remaining body parallel to the edges of the original cube-like body.

2. A retainer in accordance with claim 1, wherein said boreholes are each disposed within said cube-like body substantially tangentially to two adjacent surfaces thereof.

3. A retainer in accordance with claim 1, wherein said second joint face is provided with projections and recesses thereon, whereby said projections and recesses are capable of interconnecting with corresponding projections. and recesses on another retainer when joined together at the joint faces thereof to provide a fastening arrangement.

4. A retainer in accordance with claim 3, wherein said projections and recesses are arranged rotationally asymmetrically in relation to the spatial diagonal of said cube-like body.

5. A fastening arrangement for fastening a minimum of three struts along the spatial axes, comprising two interconnectable retainers, each said retainer being in accordance with claim 1.

6. A fastening arrangement in accordance with claim 5, wherein said boreholes in each said retainer are each disposed within said cube-like body substantially tangentially to two adjacent surfaces thereof.

7. A fastening arrangement in accordance with claim 5, wherein the second joint face of each said retainer is provided with projections and recesses thereon, arranged such that the projections and recesses on each retainer interconnect with one another when the retainers are joined together at the joint faces thereof.

8. A fastening arrangement in accordance with claim 7, wherein said projections and recesses on each said retainer are arranged rotationally asymmetrically in relation to the spatial diagonal of said cube-like body.

9. A fastening arrangement in accordance with claim 5, wherein said retainers are arranged so as to contact one another at the second joint face of each, and further including fastening means for retaining said retainers in said juxtaposition.

10. A fastening arrangement in accordance with claim 9, wherein said fastening means includes a bolt having an axis ranging longitudinally along the spatial diagonal of said cube-like bodies.

11. A fastening arrangement in accordance with claim 5, wherein the shape of each said retainer is that which would result from said cuts and drilling in which the edge length of said cube-like body and the position of said cuts in relation to a given diameter of said boreholes permit the struts to be enclosed 180° to 360° when in use.

12. A fastening arrangement in accordance with claim 11, wherein the shape of said retainer is such that the struts are enclosed about 250° to about 300° when in use.

13. A fastening arrangement in accordance with claim 9, further including spring means, disposed between said two retainers, for urging said retainers away from one another.

14. A fastening arrangement in accordance with claim 13, wherein said spring means is a coil spring.

15. A fastening arrangement of eight struts in which four struts create a rectangle in one plane and the other four struts extend perpendicularly from each of the four corners of that rectangle, wherein the struts in each of said four corners are fastened together by fastening arrangements in accordance with claim 5, with the retainers of the fastening arrangements in two of said corners being mirror images of the retainers of the fastening arrangements in the other two of said corners.

* * * * *